(12) United States Patent
Fan et al.

(10) Patent No.: US 8,787,553 B2
(45) Date of Patent: Jul. 22, 2014

(54) IMPLEMENTING A NETWORK OF INTELLIGENT VIRTUAL SERVICE AGENTS TO PROVIDE PERSONALIZED AUTOMATED RESPONSES

(75) Inventors: James Fan, San Ramon, CA (US); David Fenglin Chen, Fremont, CA (US); Jennifer K. Lam, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 88 days.

(21) Appl. No.: 13/239,968

(22) Filed: Sep. 22, 2011

(65) Prior Publication Data

US 2013/0077775 A1 Mar. 28, 2013

(51) Int. Cl.
*H04M 3/00* (2006.01)

(52) U.S. Cl.
USPC .................................. 379/265.09; 379/88.18

(58) Field of Classification Search
CPC ... H04M 3/51; H04M 3/5166; H04M 3/5183; H04M 3/5191; H04M 3/523; H04M 3/5233; H04M 2203/40; H04M 2203/402; H04M 2203/406; H04M 2203/408; H04M 3/5175; H04M 3/5237; H04M 3/5232; H04M 3/5238; H04M 3/493; H04M 3/187; H04M 3/4938; H04M 2201/40; H04M 1/271; H04M 2203/355
USPC ............... 379/88.01, 211.02, 212.01, 265.01, 379/265.02, 265.09, 265.1, 265.11, 265.12, 379/266.01, 88.16, 88.17, 88.18; 704/270.1; 705/26.1
See application file for complete search history.

(56) References Cited

U.S. PATENT DOCUMENTS

| | | | | |
|---|---|---|---|---|
| 6,070,149 | A | * | 5/2000 | Tavor et al. ................... 705/26.7 |
| 7,822,803 | B2 | | 10/2010 | Seeley et al. |
| 7,920,546 | B2 | | 4/2011 | Sylvain |
| 7,933,399 | B2 | * | 4/2011 | Knott et al. ............... 379/265.02 |
| 7,995,735 | B2 | | 8/2011 | Vos et al. |
| 2011/0119196 | A1 | * | 5/2011 | Ventura et al. ................. 705/304 |
| 2012/0131112 | A1 | * | 5/2012 | Yehaskel ....................... 709/206 |

FOREIGN PATENT DOCUMENTS

WO   WO 02/09399   *   1/2002   ............. H04M 3/00

OTHER PUBLICATIONS

A screenshot downloaded from the Internet at chatbots.org/virtual_agent/ not later than Dec. 20, 2011.

* cited by examiner

*Primary Examiner* — Antim Shah
(74) *Attorney, Agent, or Firm* — Greenblum & Bernstein, P.L.C.

(57) ABSTRACT

Communications using intelligent virtual service agents are provided by assigning a first individualized responsibility to a first intelligent virtual service agent implemented on at least one computer platform with a processor and a memory, and a second individualized responsibility to a second intelligent virtual service agent implemented on the at least one computer platform. The first intelligent virtual service agent analyzes content provided by a user via a communications medium and determined to fall under the first individualized responsibility of the first intelligent virtual service agent. The first intelligent virtual service agent generates a response to the content in accordance with the analysis by the first intelligent virtual service agent and provides the response.

18 Claims, 7 Drawing Sheets

IMPLEMENTING A NETWORK OF INTELLIGENT VIRTUAL SERVICE AGENTS TO PROVIDE PERSONALIZED AUTOMATED RESPONSES

BACKGROUND

1. Field of the Disclosure

The present disclosure relates to intelligent virtual service agents. More particularly, the present disclosure relates to networked intelligent virtual service agents for providing personalized information to users via user interfaces upon request or other form of notification from users, third parties, sensors or networked system elements.

2. Background Information

Companies provide traditional communications mechanisms such as account managers, customer service representatives, subject matter experts, interactive voice response (IVR) units, websites and email to handle user communications such as comments, inquiries, complaints, recommendations and clarifications. Recently, online mechanisms such as blogs, communities, wiki and forums, have been provided for user communications. Analytic mechanisms already used for traditional communications mechanisms can help the companies identify user concerns for the online mechanisms. For example, analytic tools are used to analyze sentiment and recommend remedies for both traditional communications mechanisms and social communications mechanisms.

DETAILED DESCRIPTION

Figure 1:
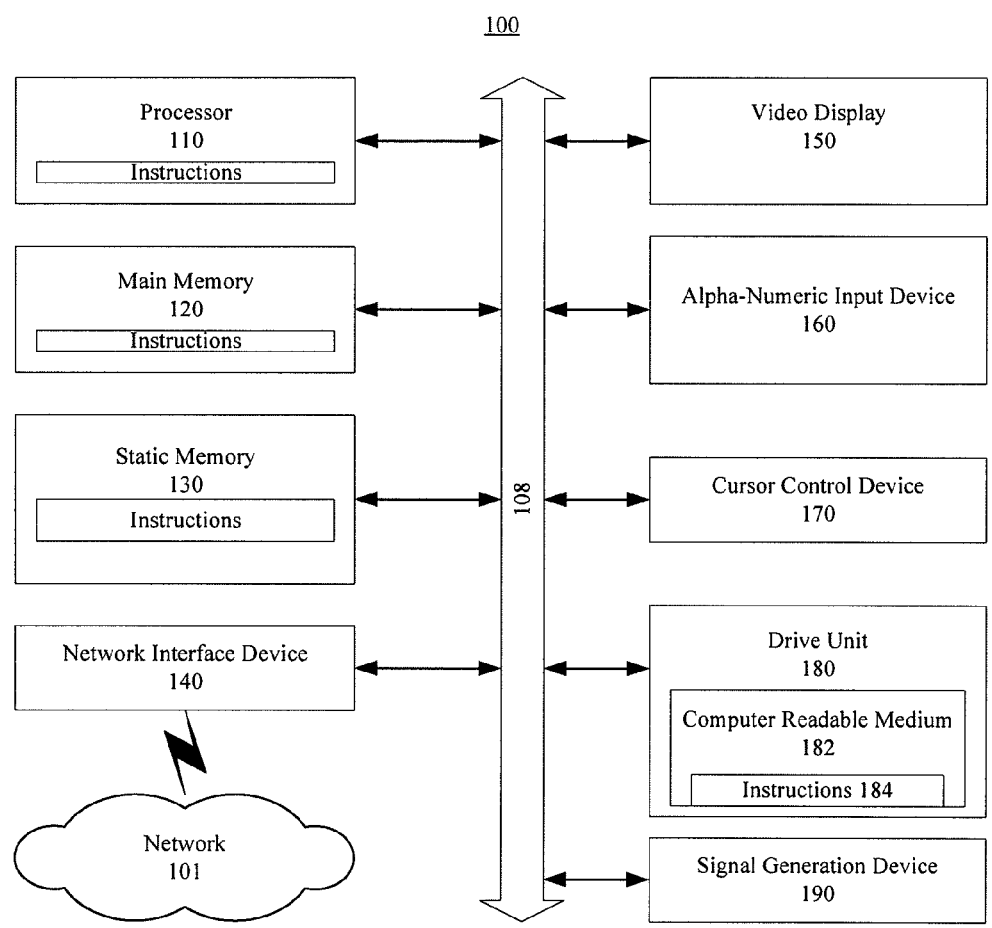
FIG. 1 shows an exemplary general computer system that includes a set of instructions for implementing a network of intelligent virtual service agents to provide personalized automated responses, according to an aspect of the present disclosure.

In view of the foregoing, the present disclosure, through one or more of its various aspects, embodiments and/or specific features or sub-components, is thus intended to bring out one or more of the advantages as specifically noted below.

As described herein, intelligent virtual service agents are implemented on computers with memory and processors. The intelligent virtual service agents are automated, non-human, computerized agents assigned specific responsibilities for interacting directly or indirectly and synchronously or asynchronously with humans via communications mediums. Responsibilities can be assigned, for example, by type of content, type of media, type of channels, and/or type of users.

As an example, an intelligent virtual service agent may be assigned responsibility by a communications service provider for voice over Internet protocol questions, or Internet protocol television questions. As another example, an agent may be assigned to scan multiple Internet sites for content, such as complaints or questions that meet predetermined parameters. When content on an Internet site meets the predetermined parameters, the agent analyzes the content and generates and provides a response to the user on the same Internet site. The scanning may also be performed by a coordinating agent that scans the Internet sites, and informs the responsible agents when a response to particular content is required. As another example, an intelligent virtual service agent or a coordinating agent may dynamically monitor content in real time as the content is provided, such as monitoring voice interactions between a caller and an interactive voice response system agent.

User content may be provided on or by communications mediums and can be analyzed by intelligent virtual service agents determined to be individually responsible for responding to the content. The responsible intelligent virtual service agent generates a response to the content in accordance with the analysis, and provides the response either directly to the user or indirectly to the user via another intelligent virtual service agent. Communications mediums as the term is used herein can include wired telephone networks, wireless telephone networks and the Internet. Internet communications can include email, chat and social sites that allow interactive posting. Channels on communications mediums are individual physical or logical communications paths that terminate at a communications address such as a telephone number or an Internet protocol address.

Intelligent virtual service agents may be configured to respond to user content over live voice agent channels, interactive voice response channels, and Internet site channels, email channels and chat channels. Additionally, a single intelligent virtual service agent may be configured to respond to user content over multiple channels, such as communications in both phone lines and multiple Internet sites. Intelligent virtual service agents can be self-directing or coordinated. Additionally, an intelligent virtual service agent can be configured to forward or otherwise direct user content to another intelligent virtual service agent so that the second intelligent virtual service agent analyzes and provides the response. The response may be provided by the other intelligent virtual service agent either directly to the user via the communications channel, or indirectly to the user via the first intelligent virtual service agent. A first intelligent virtual service agent may decide to pass responsibility for user content to the second intelligent virtual service agent when the user content falls under responsibilities assigned to the second intelligent virtual service agent, even though the determination was first made that the responsibility for the user content falls under responsibilities assigned to the first intelligent virtual service agent. Determinations of responsibility for responding to user content may be made either by the intelligent virtual service agents, or by a coordinating computer that coordinates determinations of responsibility for the agents. Initial determinations of responsibility may be made as or after the content is provided such as based on the content and/or the user providing the content, or before content is provided such as based on the channel and/or medium.

The Internet communications such as email and public social media websites may be periodically reviewed by an assigned intelligent virtual service agent to determine if the content matches responsibilities assigned to the intelligent virtual service agent. The communications mediums may also be channels for which the intelligent virtual service agent is responsible, such as calls to an intelligent virtual service agent at an interactive voice response service. The communications mediums may also be channels that are initially reviewed by a centralized system that assigns content to an intelligent virtual service agent for analysis and response.

Agents may be assigned to monitor multiple channels, such as multiple social media Internet sites. The agents may be alerted to analyze and respond to all new content in real-time, and may provide personalized responses to content such as messages from multiple social media sites. The content from users can include comments, inquiries, complaints, recommendations, trouble reports, billing or product inquiries and requests for clarifications.

The intelligent virtual service agents may be provided as a networked group, where one agent may pass content to another intelligent virtual service agent for generating a response. The intelligent virtual service agents may also be clones of account managers and/or subject matter experts. Intelligent virtual service agents can be equipped with artificial intelligence (AI), text analytic and knowledge management tools for use in personalizing responses to user content. The artificial intelligence technology in general includes computer logic and mathematical algorithms such as rule-based, reasoning-based, Bayesian, classifiers, statistics, and neural networks, etc. The artificial intelligence and text analytic tools can be used to derive language, tone, subject and meaning in user content, and the knowledge management tools can be used to personalize the responses. Agents may also be self-learning, where instances of failure in providing responses can be determined from user feedback to result in adjusting the manner in which future personalized responses are generated.

When an intelligent virtual service agent is not able to assemble a response using its existing logical configuration, the content may be routed to another intelligent virtual service agent. Alternatively, the original intelligent virtual service agent may reconfigure itself with an alternative or additional logical configuration that may be more appropriate for assembling a response to content. Difficult content may also be brought to the attention of a responsible human account manager or center staff for special attention. Users may also be guided to rephrase difficult content to assist an intelligent virtual service agent to provide a personalized response.

Intelligent virtual service agents may be either peer-to-peer agents that handle the same level of works, or hierarchical agents that range in progression from inexperienced to proficient. Intelligent virtual service agents can be networked via standard application interfaces to support knowledge federation to support one another.

Intelligent virtual service agents can be configured as clones of a personalized assistant staff or as business domain expert to support domain specific responses. For example, an intelligent virtual service agent can be configured to be responsible for services such as repair and trouble shooting, or new product introduction, or credit and billing. Each intelligent virtual service agent can be focused on one designated domain, but have capability to find another intelligent virtual service agent in another domain to route content to the intelligent virtual service agent in the other domain. That is, when an intelligent virtual service agent detects content related to a domain other than its own, the content can be routed to the intelligent virtual service agent in charge of the other domain for a response.

FIG. 1 is an illustrative embodiment of a general computer system, on which a method to implement a network of intelligent virtual service agents to provide personalized automated responses can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a server computer, a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2:
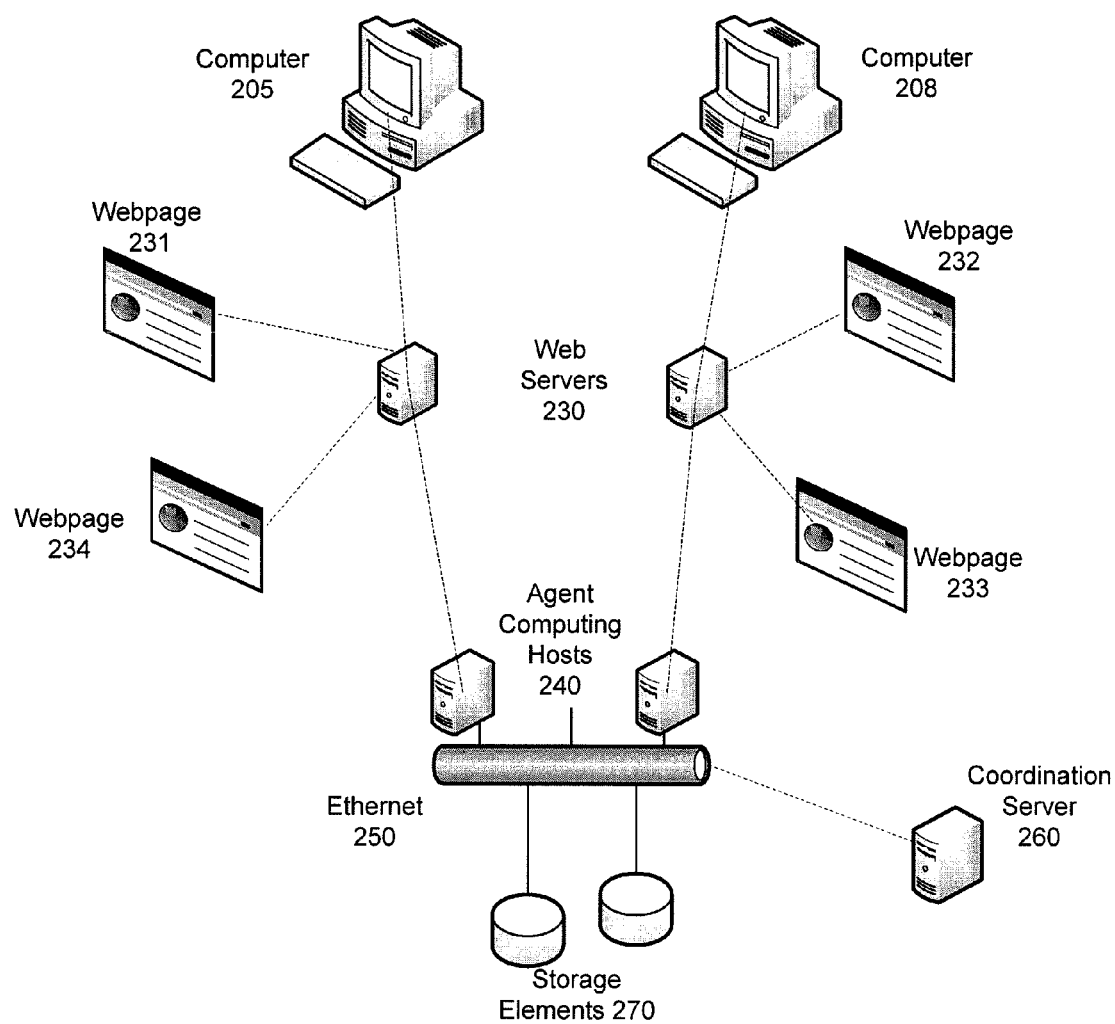
FIG. 2 shows an exemplary network that includes intelligent virtual service agents to provide personalized automated responses, according to an aspect of the present disclosure.

FIG. 2 shows an exemplary network that includes intelligent virtual service agents to provide personalized automated responses, according to an aspect of the present disclosure. In FIG. 2, user computers 205 and 208 are exemplary user devices used to access webpages 231-234 via web servers 230. The web servers 230 are monitored by or notify agent computing hosts 240 of content provided by the users. Agent computing hosts 240 communicate over an ethernet network 250 with each other, with storage elements 270, and with coordination server 260. The storage elements 270 store information of any sort that may be used by intelligent virtual service agents to provide personalized automated responses to users. The coordination server 260 coordinates responsibility assignments and re-assignments of agents on the agent computing hosts 240.

Users may be authenticated before allowing the users to post content on a website for analysis by an intelligent virtual service agent. Authentication may be performed by requiring the user to sign in with a password, account number or name, or answer security questions. The authentication may also be performed in the background, such as by using cookies or by otherwise inspecting a user's communications address. Intelligent virtual service agents may also support unauthenticated customers to entertain general public comments/inquiries without requiring a login or passcode etc.

As an exemplary use of an intelligent virtual service agent, a communications company may use an intelligent virtual service agent to handle multiple channel support issues. When a customer calls into an 800 support line, an interactive voice response (IVR) system handles the call and asks for an intelligent virtual service agent to be assigned. The assignment of the intelligent virtual service agent can be based on the history record such as what live agents were assigned to handle the caller's issue, and information related to the customer from other channels etc. If the same customer later comes to the support domain via an Internet site rather than the interactive voice response (IVR) system, the same intelligent virtual service agent can be assigned. The intelligent virtual service agent can then provide a seamless experience to the customer independent of the domain and channel the customer uses. Here, each intelligent virtual service agent acts as a secretary and assistant to a real live agent, and therefore will possess traits and characteristics of the real live agent. The intelligent virtual service agent will look up information from back end systems and networks to assist diagnostics and trouble-shooting activities. Additionally, the intelligent virtual service agent can interact with other intelligent virtual service agents directly or indirectly to learn social information about the customer. Based on back end information and social information, the assigned virtual agent will perform product upgrades or provide recommendations to the customer.

In the example of the intelligent virtual service agent for the communications company, the virtual agent can also record all interactions with the customer and direct a peer intelligent virtual service agent to roll interaction information into analytics. The intelligent virtual service agent will have the capability to rephrase past conversations with the customers if needed. When the customer decides to speak in two different languages, the intelligent virtual service agent can bridge another intelligent virtual service agent with real-time translation capability to enhance the user experience. When a relative of the customer calls for the same trouble but cannot speak English, the on demand translation services can be performed so that the transaction can still be accomplished by the same intelligent virtual service agent. Using the intelligent virtual service agents, the customer experience can be dramatically improved, and trouble can be resolved without a live person being involved. This intelligent virtual service agent can accomplish many tasks by communicating with peer agents, and thereby may mimic or even improve on the performance and characteristics of human agents.

An intelligent virtual service agent application can also be downloaded by a customer to a smartphone or computer to become the personal assistant for the customer for all products and services from the service provider that provides the intelligent virtual service agent application. The intelligent virtual service agent can also explain product advantages to the friends of the customer. Here, the intelligent virtual service agent can communicate with the service provider's back end systems and other intelligent virtual service agents in order to obtain additional information and experiences to enhance the user's experience with the intelligent virtual service agent.

Figure 3:
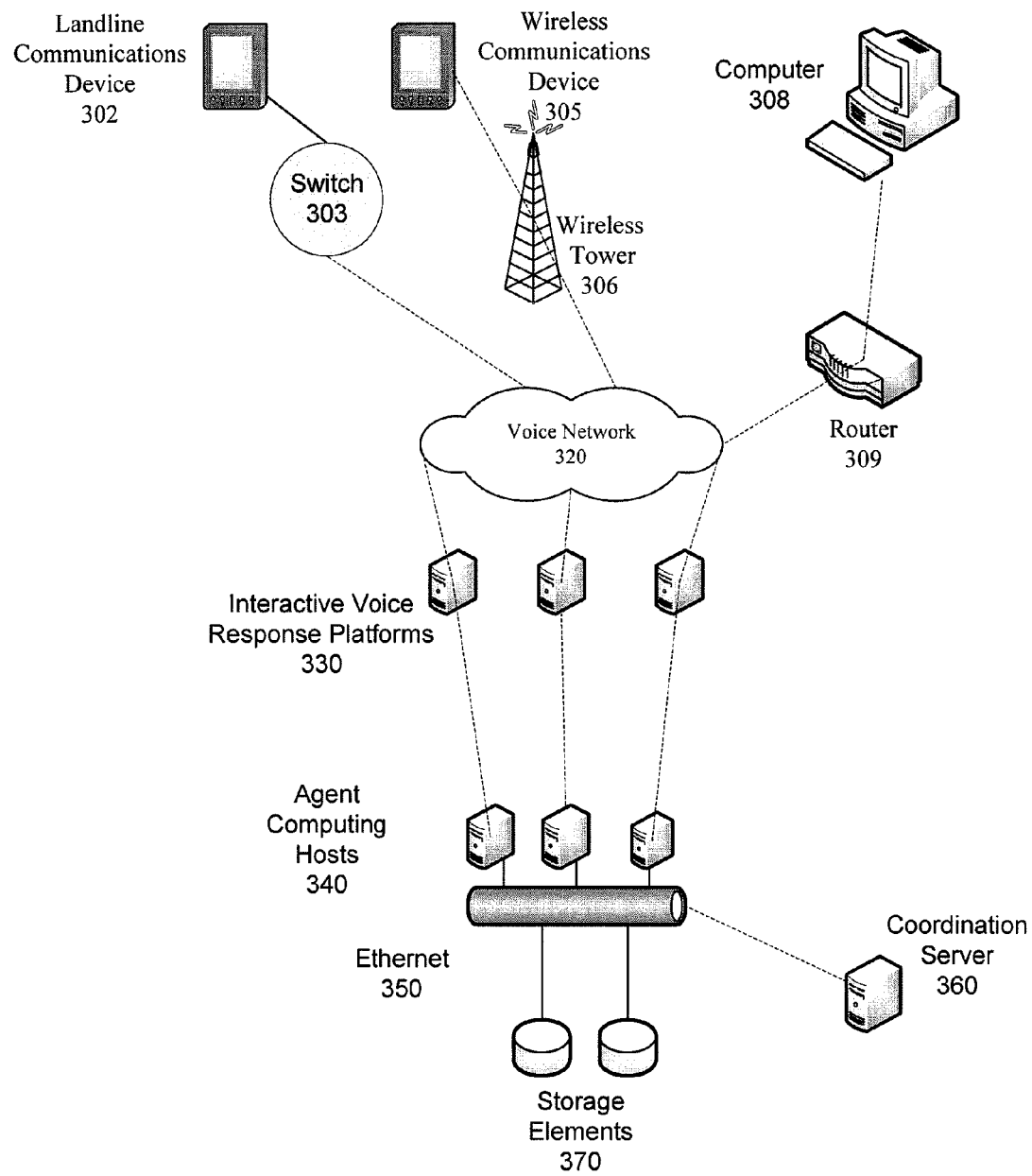
FIG. 3 shows another exemplary network that includes intelligent virtual service agents to provide personalized automated responses, according to an aspect of the present disclosure.

FIG. 3 shows another exemplary network that includes intelligent virtual service agents to provide personalized automated responses, according to an aspect of the present disclosure. In FIG. 3, a user uses landline communications device 302 to communicate via a switch 303 and voice network 320 with interactive voice response platforms 330. A user uses wireless communications device 305 to communicate via a wireless tower 306 and voice network 320 with the interactive voice response platforms 330. A user uses computer 308 to communicate via a router 309 and voice network 320 with interactive voice response platforms 330. The interactive voice response platforms 330 are monitored by or notify agent computing hosts 340 of content provided by the users. Agent computing hosts 340 communicate over an ethernet network 350 with each other, with storage elements 370, and with coordination server 360. The storage elements 370 store information of any sort that may be used by intelligent virtual service agents to provide personalized automated responses to users. The coordination server 360 coordinates responsibility assignments and re-assignments of agents on the agent computing hosts 340.

Figure 4:
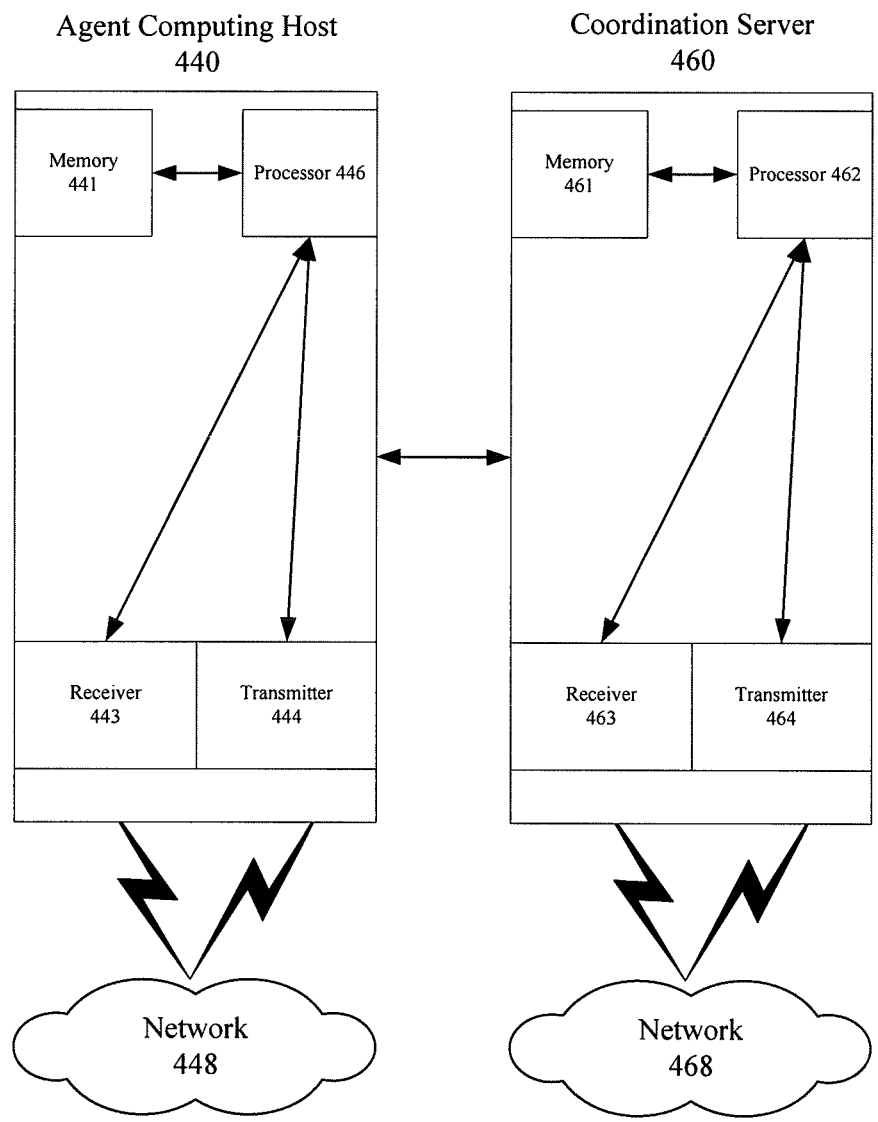
FIG. 4 shows an exemplary agent computing host and an exemplary coordination server for implementing a network of intelligent virtual service agents to provide personalized automated responses, according to an aspect of the present disclosure.

FIG. 4 shows an exemplary agent computing host and an exemplary coordination server for implementing a network of intelligent virtual service agents to provide personalized automated responses. In FIG. 4, agent computing host 440 includes a memory 441, a processor 446, a receiver 443 and a transmitter 444. The receiver 443 and transmitter 444 communicate over network 448. The processor 446 processes instructions and data from the receiver 443 and memory 441, and forwards instructions or data to transmitter 444 for transmission or to memory 441 for storage. In FIG. 4, coordination server 460 includes a memory 461, a processor 462, a receiver 463 and a transmitter 464. The receiver 463 and transmitter 464 communicate over network 468. The processor 462 processes instructions and data from the receiver 463 and memory 461, and forwards instructions or data to transmitter 464 for transmission or to memory 461 for storage.

The agent computing host 440 and coordination server 460 also communicate with each other in the embodiment of FIG. 4. The servers may communicate over a communications network, or may alternatively be implemented on the same physical computer.

Figure 5:
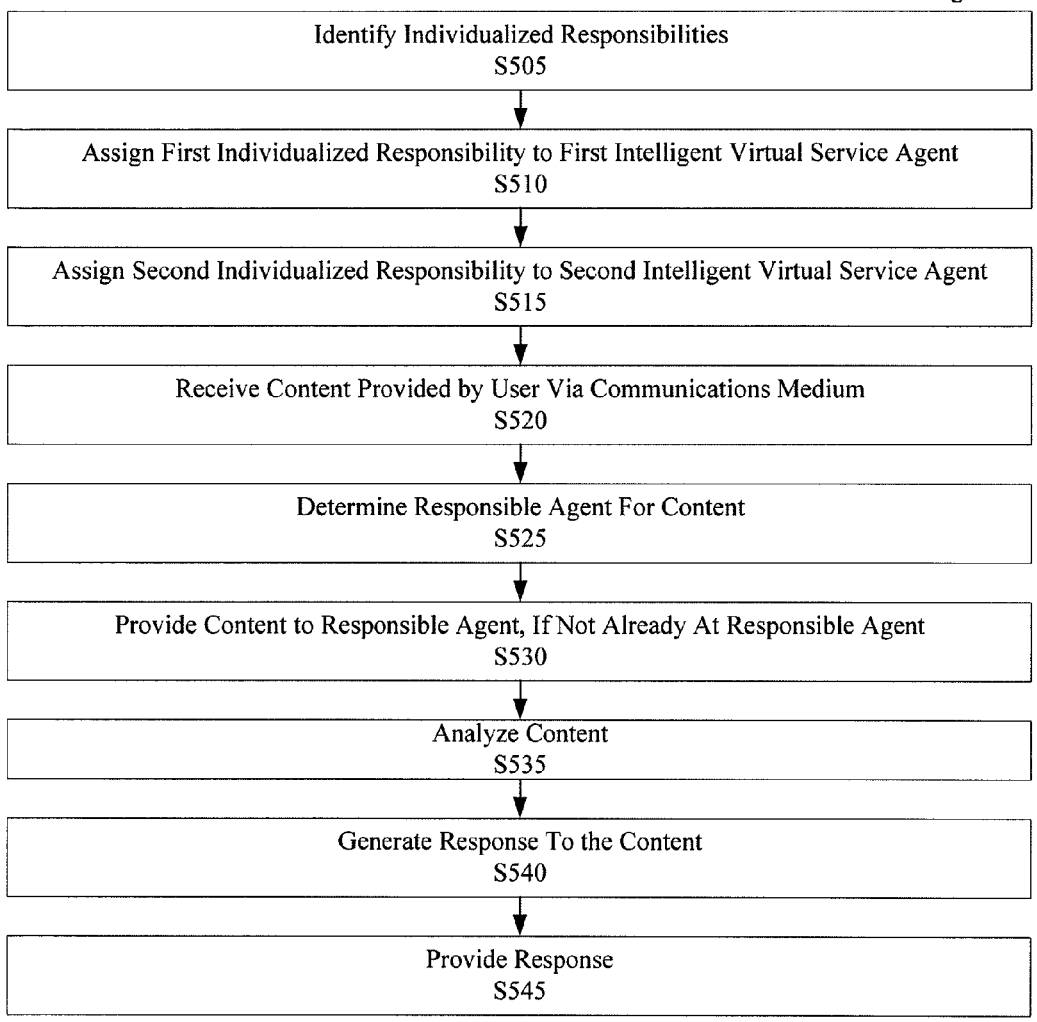
FIG. 5 shows an exemplary process for implementing a network of intelligent virtual service agents to provide personalized automated responses, according to an aspect of the present disclosure.

FIG. 5 shows an exemplary process for implementing a network of intelligent virtual service agents to provide personalized automated responses, according to an aspect of the present disclosure. In FIG. 5, individualized responsibilities are identified at S505. A first individualized responsibility is assigned to a first intelligent virtual service agent at S510, and a second individualized responsibility is assigned to a second intelligent virtual service agent at S515. Content provided by a user via a communications medium is received at S520.

As an example, the individualized responsibilities may be defined and assigned by an administrator of one or more social channels. The channels can be Internet websites that allow customers to post content for answer by the administrator and/or by other customers and users. The responsibilities may include responsibilities for various customer/user characteristics determined from the content, including language, gender, age, emotional state, location or any other type of customer/user characteristics that can be ascertained in some way from a communication. The responsibilities may also include responsibilities for certain types of subject matter, such as billing, product information or complaints. The intelligent virtual service agents are provided with artificial intelligence, text analytics, and knowledge management tools to provide the real-time or near real-time personalized services. The intelligent virtual service agents may also possess self-learning capability, so as to adjust behavior based upon feedback of errors or shortcomings in the personalized responses provided to users.

At S525, the agent responsible for the content is determined. At S530, if the content is not already at the responsible agent, the content is provided to the responsible agent.

At S535, the content is analyzed. For example, intelligent virtual service agents can be configured to respond to specific inquires, respond to blog posts, and provide personalized recommendations. The content may be analyzed by analyzing the words and language of the post, as well as information about the poster and the medium on which the content is provided.

Intelligent virtual service agents can also be configured to support upfront user interfaces as well as back end system data mining and analytics. For example, intelligent virtual service agents can be configured to communicate with users using similar communications devices with different operating systems, as well as different types of communications devices. Intelligent virtual service agents can also be configured to retrieve data from back end systems such as databases of previous user interactions and databases of customer data.

Intelligent virtual service agents can also be configured to mine and analyze data in back end systems or public data in the Internet to improve responses to users when users indicate a response is unsatisfactory. Customers may also be given the option to opt-in or opt-out of auto-response features when using any of the social or regular channels.

At S540, a response to the content is generated. The method of FIG. 5 and other embodiments described herein can be used to provide real-time, intelligent and personalized responses to multiple, or in some circumstances all, messages on multiple social media Internet sites or other channels. The response can be generated using user data from storage elements 270 and 370 in FIGS. 2 and 3. For example, a customer may simply be requesting information about their account that can be provided by an intelligent virtual service agent. The response may also be more complex, such as a response to a technical question such as how to set up home wireless networking equipment. In the complex example, the intelligent virtual service agent may refer to a knowledge database that includes previous inquiries by other users along with successful answers. The intelligent virtual service agent may also refer to multiple sources of data, such as user data and the knowledge database, to find information about the user's home wireless networking data from the account information and the technical answer to the question from the knowledge database.

Customer data may be pulled from customers only upon consent of the customer in some circumstances. Intelligent virtual service agents supporting authenticated customers can refer to the customer data for behavioral and account information as background for personalized context in preparing a response. In an embodiment, a customer may also issue a reset request to remove accumulated contextual knowledge information. The personalization aspect of the operation of the intelligent virtual service agent can result in two different users receiving different responses to the same content provided on the same channel. The difference in responses may be due to customer data retrieved by the intelligent virtual service agent, or to differences in the feedback from previous interactions involving the intelligent virtual service agents. Thus, customers can receive differentiated customer experiences with more relevant response by interacting with intelligent virtual service agents. The personalization may also include automated intelligent virtual service agents being provided with voice characteristics of a human agent, or voice characteristics that differ from voice characteristics of other intelligent virtual service agents. For example, voice characteristics of the intelligent virtual service agents may differ in accent, pace of speech, language, pitch, tone and other voice characteristics that can be modeled in generating synthetic speech.

At S545 the response is provided. In the embodiments described herein, the response is provided by the intelligent virtual service agent either directly to the users on or by the communications medium in which the content was received, or indirectly to the users via another intelligent virtual service agent that is interacting directly with users on or by the communications medium in which the content was received.

Multiple intelligent virtual service agents may also be networked as peers with similar configurations and resources, or in a hierarchical network with one such agent subservient to another for all or some circumstances. The embodiment of FIG. 3 shows the agent computing hosts 340 being coordinated by a coordination server 360. In other embodiments, agents in a peer-to-peer or hierarchical arrangement can be self-directed to handle their own responsibilities and communicate with other agents when appropriate.

Figure 6:
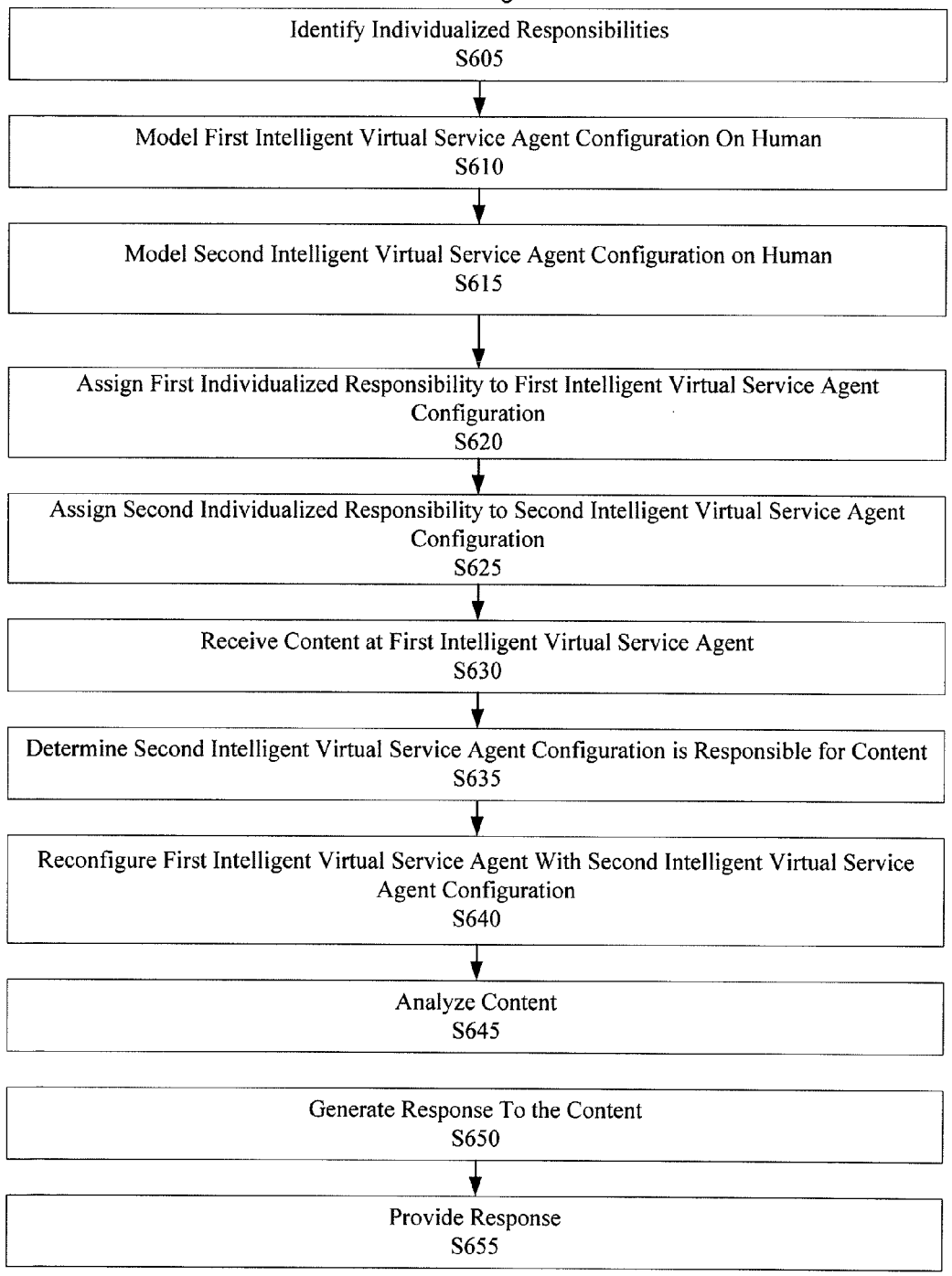
FIG. 6 shows another exemplary process for implementing a network of intelligent virtual service agents to provide personalized automated responses, according to an aspect of the present disclosure.

FIG. 6 shows another exemplary process for implementing a network of intelligent virtual service agents to provide personalized automated responses, according to an aspect of the present disclosure. In FIG. 6, individualized responsibilities are identified at S605. A first intelligent virtual service agent configuration is modeled on a human at S610, and a second intelligent virtual service agent configuration is modeled on a human at S615. Here, the intelligent virtual service agents are modeled as clones of different human agent, though a single human agent may have different cloned intelligent virtual service agents for different aspects of the human agent's responsibilities. The modeling may include providing the intelligent virtual service agent with voice and language characteristics of a human agent. A first individualized responsibility is assigned to the first intelligent virtual service agent configuration at S620, and a second individualized responsibility is assigned to a second intelligent virtual service agent configuration at S625. In other embodiments, the intelligent virtual service agents are not modeled on actual agents, but are instead configured to respond to particular subjects.

Content is received at the first intelligent virtual service agent at S630. At S635, a determination is made as to whether the second intelligent virtual service agent configuration is responsible for the content. At S640, the first intelligent virtual service agent is reconfigured with the second intelligent virtual service agent configuration. At S645, the content is analyzed, and at S650 a response to the content is generated. At S655, the response is provided.

As an example, an intelligent virtual service agent can analyze an initial communication from a user, and use the analysis results to provide options to the user of alternative phrases of content that might help clarify the user's inquiry. The intelligent virtual service agents can thus narrow an original comment down to a specific topic. The intelligent virtual service agents can also post questions back to the user to help the user better rephrase a comment.

As described herein, multiple agents may be networked together and coordinated by a coordination server 360. Alternatively, the intelligent virtual service agents can collaborate with one another, or with human agents, by direct communications. As an example, an emergency calltaking agent may be configured to provide emergency assistance to emergency callers. An intelligent virtual service agent may monitor communications between an emergency caller and the emergency calltaking agent, and determine that the emergency caller is providing content that falls under the responsibility of the intelligent virtual service agent.

When the caller is using a multimedia device such as a smartphone or computer, the intelligent virtual service agent may offer video, graphic or audio assistance to the caller. For example, the intelligent virtual service agent may detect that the emergency caller speaks words indicating that someone is not breathing, so that the intelligent virtual service agent offers the human agent an option to forward a brief but repeating video clip of cardiopulmonary resuscitation (CPR) to the human caller's smart phone. The video clip may be retrieved from a library of video clips and/or audio clips for different situations. In this way, the intelligent virtual service agent is responding to content from the emergency caller.

In another embodiment, an intelligent virtual service agent provides assistance for another intelligent virtual service agent rather than for a human agent, either at the request of the other intelligent virtual service agent or a coordinator for the intelligent virtual service agents. Additionally, an intelligent virtual service agent may be requested to respond to content by another intelligent virtual service agent, or even by a sensor that monitors for specific content on a communications medium. Requests that result in responses can therefore come from the users, from third parties such as intervening operators, from sensors or monitors, or from networked elements.

Figure 7:
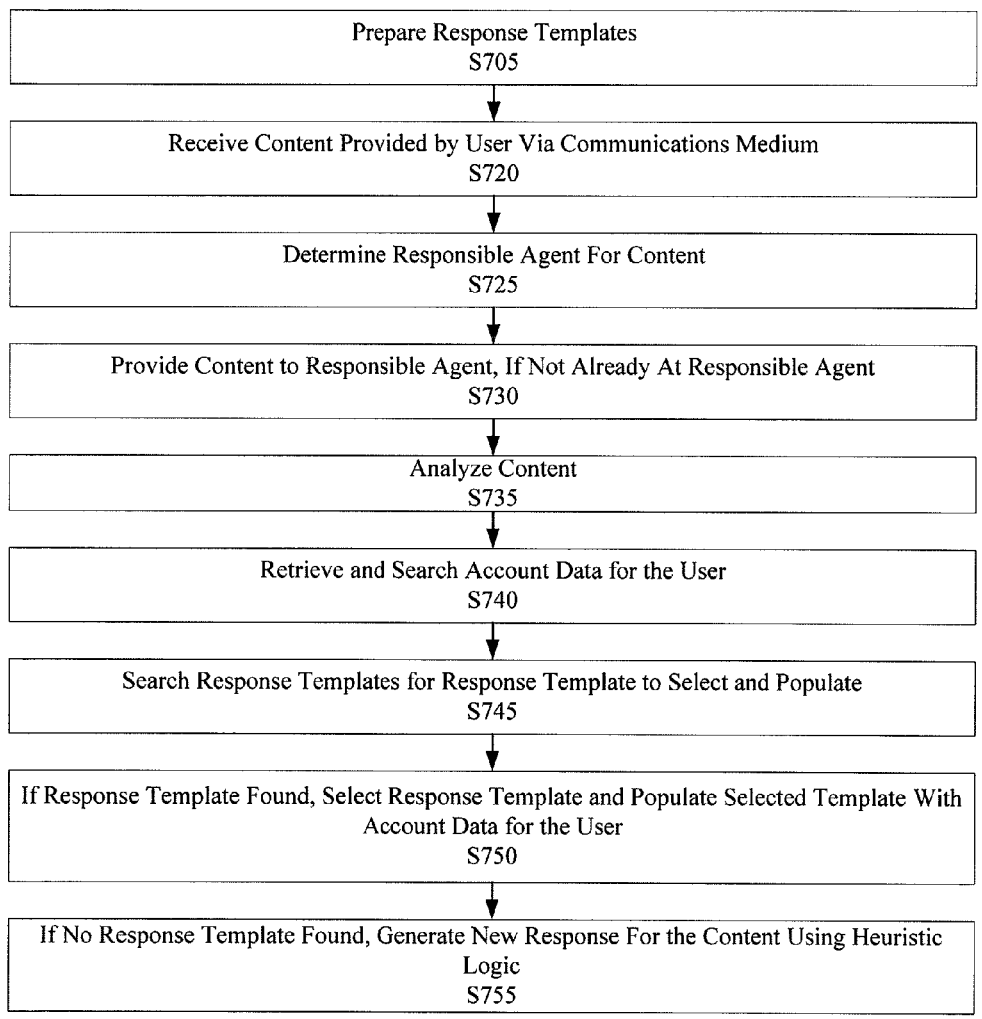
FIG. 7 shows another exemplary process for implementing a network of intelligent virtual service agents to provide personalized automated responses, according to an aspect of the present disclosure.

FIG. 7 shows another exemplary process for implementing a network of intelligent virtual service agents to provide personalized automated responses, according to an aspect of the present disclosure. At S705, response templates are prepared. At S720, content provided by a user via a communications medium is received. At S725, a determination is made as to the responsible agent for the content. At S730, if the content is not already at the responsible agent, the content is provided to the responsible agent. At S735, the content is analyzed.

Account data for the user is retrieved and searched at S740. Response templates are searched for a response template to select and populate at S745. If a response template is found, the response template is selected and populated with account data for the user at S750. If no response template is found, a new response is generated for the content using heuristic logic at S755. The heuristic logic includes processes for generating a proper response using guidelines and previous experience of success and failure of the intelligent virtual service agent and other intelligent virtual service agents, such as categorized interactions with users stored in a knowledge database in the storage elements 270 of FIG. 2 or 370 of FIG. 3.

Intelligent virtual service agents may have a self-learning capability. The intelligent virtual service agents may receive feedback from users in order to determine when responses to content are unsatisfactory, and any determinable reasons why the responses to content are unsatisfactory. The feedback may be incorporated into the resources used by the intelligent virtual service agent so as to avoid providing the same or similar responses to the same or similar content in future instances.

As described in the present disclosure, organizations can use intelligent virtual service agents across domains including interactive voice response systems, emails and Internet websites, and network monitoring and analysis systems. The intelligent virtual service agents can be given specific responsibilities for different domains and mediums, different websites and addresses, different types of content and subject matter, and different types of users. The intelligent virtual service agents described herein are additionally scalable for organizations with different customer facing, network facing, and system facing domains. As an example, the intelligent virtual service agents described herein allow knowledge sharing across different domains, so that even different intelligent virtual service agents assigned responsibilities for different domains can obtain knowledge and experience from one another. As a case example, a bank with an interactive voice response system and an Internet website can use multiple different intelligent virtual service agents in order to distribute responsibilities for responding to content from users/callers/visitors.

As set forth herein, according to an aspect of the present disclosure, a method of communicating using intelligent virtual service agents includes assigning a first individualized responsibility to a first intelligent virtual service agent implemented on at least one computer platform with a processor and a memory, and a second individualized responsibility to a second intelligent virtual service agent implemented on the at least one computer platform. The first intelligent virtual service agent analyzes content provided by a user via a communications medium and determined to fall under the first individualized responsibility of the first intelligent virtual service agent. The first intelligent virtual service agent generates a response to the content in accordance with the analysis by the first intelligent virtual service agent and providing the response.

According to another aspect of the present disclosure, the determination that the content falls under the first individualized responsibility of the first intelligent virtual service agent is made by the first intelligent virtual service agent.

According to yet another aspect of the present disclosure, the determination that the content falls under the first individualized responsibility of the first intelligent virtual service agent is made by an automated centralized controller that determines the first intelligent virtual service agent is responsible for the content.

According to still another aspect of the present disclosure, the content provided by the first requestor is analyzed by the second intelligent virtual service agent before the analysis by the first intelligent virtual service agent, and determined by the second intelligent virtual service agent to fall under the first individualized responsibility of the first intelligent virtual service agent.

According to another aspect of the present disclosure, the first individualized responsibility of the first intelligent virtual service agent includes a topic in the content.

According to yet another aspect of the present disclosure, the first individualized responsibility of the first intelligent virtual service agent includes communications in a language by which the content is provided.

According to still another aspect of the present disclosure, the communications medium is a public social media Internet site and the response is provided on the communications medium.

According to another aspect of the present disclosure, the first intelligent virtual service agent is modeled based on characteristics of a first human, and the second intelligent virtual service agent is modeled based on characteristics of a second human.

According to yet another aspect of the present disclosure, the method also includes remodeling the first intelligent virtual service agent based on the characteristics of the second human.

According to still another aspect of the present disclosure, the method also includes determining availability of the first intelligent virtual service agent and the second intelligent virtual service agent by a central controller.

According to another aspect of the present disclosure, the first intelligent virtual service agent monitors the communications medium to determine whether content falls under the first individualized responsibility of the first intelligent virtual service agent.

According to still another aspect of the present disclosure, the first intelligent virtual service agent receives responsibility to analyze and respond to the content from a central controller.

According to yet another aspect of the present disclosure, the method also include re-assigning responsibility for analyzing the content based on feedback to the response received from the user.

According to another aspect of the present disclosure, the first intelligent virtual service agent communicates with cloned human characteristics.

According to still another aspect of the present disclosure, the method also includes searching for account data for the requestor and basing the response to the requestor on results of the search for account data for the user.

According to yet another aspect of the present disclosure, the method also includes searching a set of response templates for a template for the response, and populating the template for the response with selected facts before providing the response via the communications medium.

According to another aspect of the present disclosure, the method also includes generating a new response using heuristic logic based on the content when the response is not found in the set of searched response templates.

According to still another aspect of the present disclosure, the requestor is automated.

According to an aspect of the present disclosure, at least one non-transitory computer readable medium stores a set of executable instructions for communicating using intelligent virtual service agents. The executable instructions, when executed by a processor, cause a computer to assign a first individualized responsibility to a first intelligent virtual service agent implemented on at least one computer platform with a processor and a memory, and a second individualized responsibility to a second intelligent virtual service agent implemented on the at least one computer platform. The executable instructions, when executed by a processor for the first intelligent virtual service agent, analyze content provided by a user via a communications medium and determined to fall under the first individualized responsibility of the first intelligent virtual service agent. The executable instructions, when executed by a processor for the first intelligent virtual service agent, also generate a response to the content in accordance with the analysis by the first intelligent virtual service agent, and provide the response.

According to an aspect of the present disclosure, at least one computer platform executes executable instructions for communicating using intelligent virtual service agents. The at least one computer platform includes memory and a processor. The processor executes the executable instructions, and the instructions, when executed, cause the at least one computer platform to assign a first individualized responsibility to a first intelligent virtual service agent implemented on at least one computer platform with a processor and a memory, and a second individualized responsibility to a second intelligent virtual service agent implemented on the at least one computer platform. The first intelligent virtual service agent on a computer platform analyzes content provided by a first user via a communications medium and determined to fall under the first individualized responsibility of the first intelligent virtual service agent. The first intelligent virtual service agent also generates a response to the content in accordance with the analysis by the first intelligent virtual service agent, and provides the response.

While a computer-readable medium herein may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of communicating using intelligent virtual service agents, comprising:
    assigning a first individualized responsibility to a first intelligent virtual service agent implemented on a first computer platform with a processor and a memory, and a second individualized responsibility to a second intelligent virtual service agent implemented on a second computer platform;
    determining, by the first intelligent virtual service agent, whether content provided by a user onto a monitored internet page falls under the first individualized responsibility of the first intelligent virtual service agent;
    analyzing, by the first intelligent virtual service agent, the content provided by the user when the content falls under the first individualized responsibility of the first intelligent virtual service agent;
    when the content falls under the first individualized responsibility of the first intelligent virtual service agent, searching a set of response templates for a template for a response to the content, and when the response is found in the set of searched response templates, populating the template for the response, and when the response is not found in the set of searched response templates, generating a new response based on the content, wherein the response to the content is generated in accordance with the analysis by the first intelligent virtual service agent when the content falls under the first individualized responsibility of the first intelligent virtual service agent; and
    providing the response to the content onto the monitored internet page.

2. The method according to claim 1,
    wherein the content provided by the user is analyzed by the second intelligent virtual service agent before the analysis by the first intelligent virtual service agent, and determined by the second intelligent virtual service agent to fall under the first individualized responsibility of the first intelligent virtual service agent.

3. The method according to claim 1,
    wherein the first individualized responsibility of the first intelligent virtual service agent includes a topic in the content.

4. The method according to claim 1,
    wherein the first individualized responsibility of the first intelligent virtual service agent includes communications in a language by which the content is provided.

5. The method according to claim 1,
    wherein the monitored internet page is a public social media Internet site and the response is provided on the monitored internet page.

6. The method according to claim 1,
    wherein the first intelligent virtual service agent is modeled based on characteristics of a first human, and the second intelligent virtual service agent is modeled based on characteristics of a second human.

7. The method according to 6, further comprising:
    remodeling the first intelligent virtual service agent based on the characteristics of the second human.

8. The method according to claim 1, further comprising:
    determining availability of the first intelligent virtual service agent and the second intelligent virtual service agent by a central controller.

9. The method according to claim 1,
wherein the first intelligent virtual service agent monitors the internet page to determine whether content falls under the first individualized responsibility of the first intelligent virtual service agent.

10. The method according to claim 1,
wherein the first intelligent virtual service agent receives responsibility to analyze and respond to the content from a central controller.

11. The method according to claim 1, further comprising:
re-assigning responsibility for analyzing the content based on feedback to the response received from the user.

12. The method according to claim 1,
wherein the first intelligent virtual service agent communicates with cloned human characteristics.

13. The method according to claim 1, further comprising:
searching for account data for the user and basing the response to the user on results of the search for account data for the user.

14. The method according to claim 1,
wherein the template is populated with selected facts before providing the response via the monitored internet page.

15. The method according to claim 14,
wherein the new response is generated using heuristic logic based on the content.

16. The method according to claim 1,
wherein the user is automated.

17. At least one non-transitory computer readable medium that stores a set of executable instructions for communicating using intelligent virtual service agents, the executable instructions, when executed by a processor, causing a computer to:
assign a first individualized responsibility to a first intelligent virtual service agent implemented on a first computer platform with a processor and a memory, and a second individualized responsibility to a second intelligent virtual service agent implemented on a second computer platform;
determine, by the first intelligent virtual service agent, whether content provided by a user onto a monitored internet page falls under the first individualized responsibility of the first intelligent virtual service agent;
analyze, by the first intelligent virtual service agent, the content provided by the user via when the content falls under the first individualized responsibility of the first intelligent virtual service agent;
when the content falls under the first individualized responsibility of the first intelligent virtual service agent, search a set of response templates for a template for a response to the content, and when the response is found in the set of searched response templates, populate the template for the response, and when the response is not found in the set of searched response templates, generate a new response based on the content, wherein the response to the content is generated in accordance with the analysis by the first intelligent virtual service agent when the content falls under the first individualized responsibility of the first intelligent virtual service agent; and
provide the response to the content onto the monitored internet page.

18. A computer platform system that executes executable instructions for communicating using intelligent virtual service agents, the computer platform system comprising:
memory; and
a processor,
wherein the processor executes the executable instructions, and the instructions, when executed, cause the computer platform system to assign a first individualized responsibility to a first intelligent virtual service agent implemented on a first computer platform with a processor and a memory, and a second individualized responsibility to a second intelligent virtual service agent implemented on a second computer platform with a processor and a memory;
wherein the first intelligent virtual service agent determines whether content provided by a user onto a monitored internet page falls under the first individualized responsibility of the first intelligent virtual service agent;
wherein the first intelligent virtual service agent analyzes the content provided by the user when the content falls under the first individualized responsibility of the first intelligent virtual service agent;
wherein, when the content falls under the first individualized responsibility of the first intelligent virtual service agent, the first intelligent virtual service agent searches a set of response templates for a template for a response to the content, and when the response is found in the set of searched response templates, populates the template for the response, and when the response is not found in the set of searched response templates, generates a new response based on the content, wherein the response to the content is generated in accordance with the analysis by the first intelligent virtual service agent when the content falls under the first individualized responsibility of the first intelligent virtual service agent; and
wherein the first intelligent virtual service agent provides the response to the content onto the monitored internet page.

* * * * *